Sept. 8, 1970   W. T. TEAGLE   3,527,033
AGRICULTURAL MOWERS

Filed May 15, 1967   7 Sheets-Sheet 1

INVENTOR
William Thomas Teagle
by Norris & Bateman
ATTORNEYS

Sept. 8, 1970     W. T. TEAGLE     3,527,033
AGRICULTURAL MOWERS

Filed May 15, 1967     7 Sheets-Sheet 3

INVENTOR
William Thomas Teagle
by Norris & Bateman
ATTORNEYS

Sept. 8, 1970 W. T. TEAGLE 3,527,033
AGRICULTURAL MOWERS
Filed May 15, 1967 7 Sheets-Sheet 4

INVENTOR
William Thomas Teagle
by Norris & Bateman
ATTORNEYS

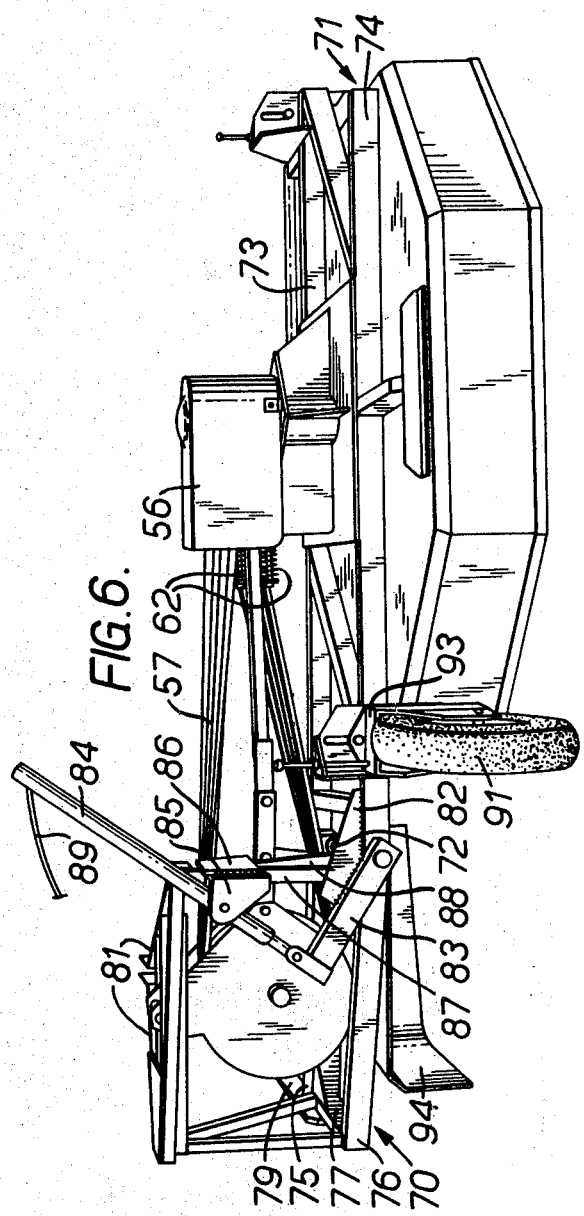

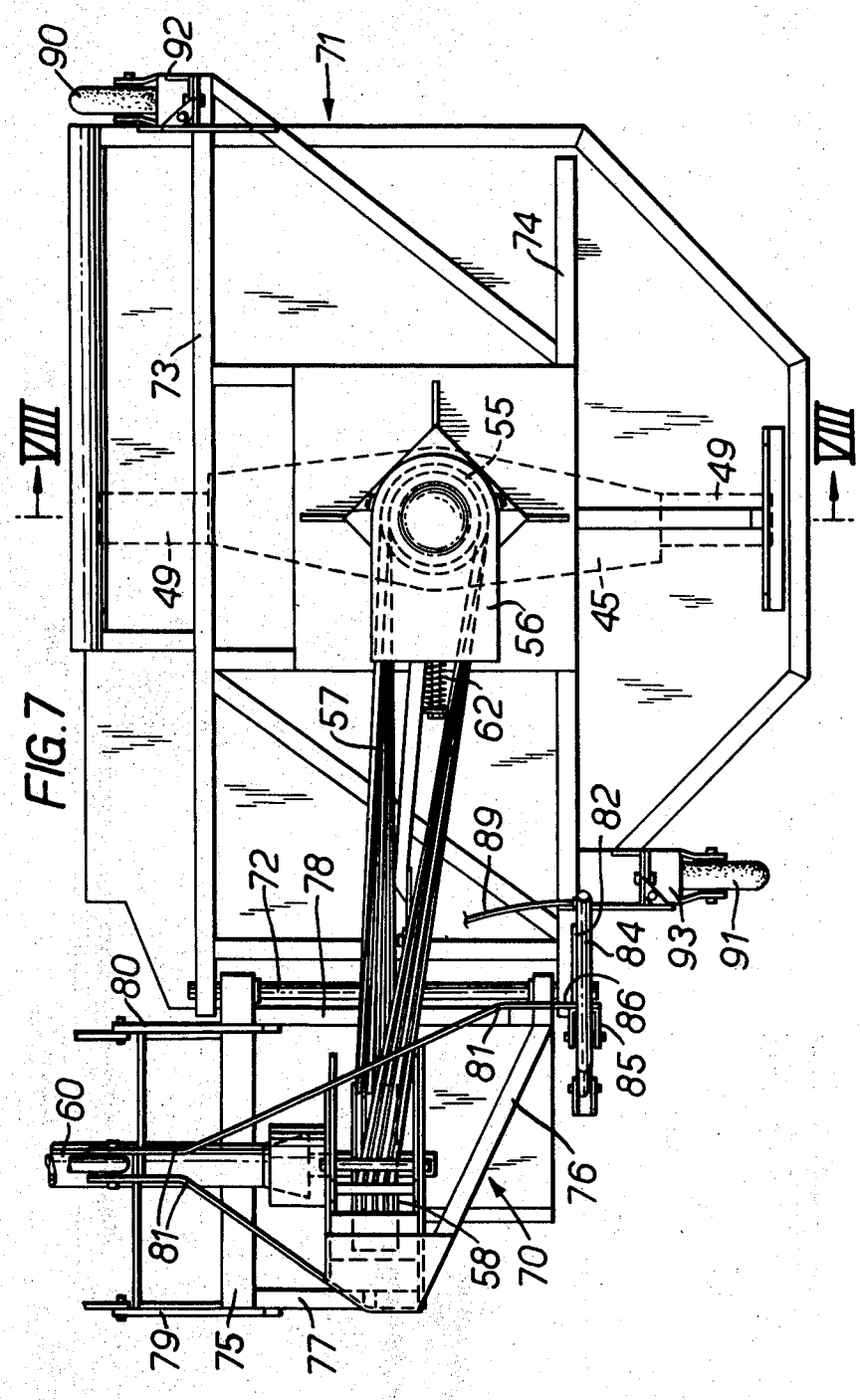

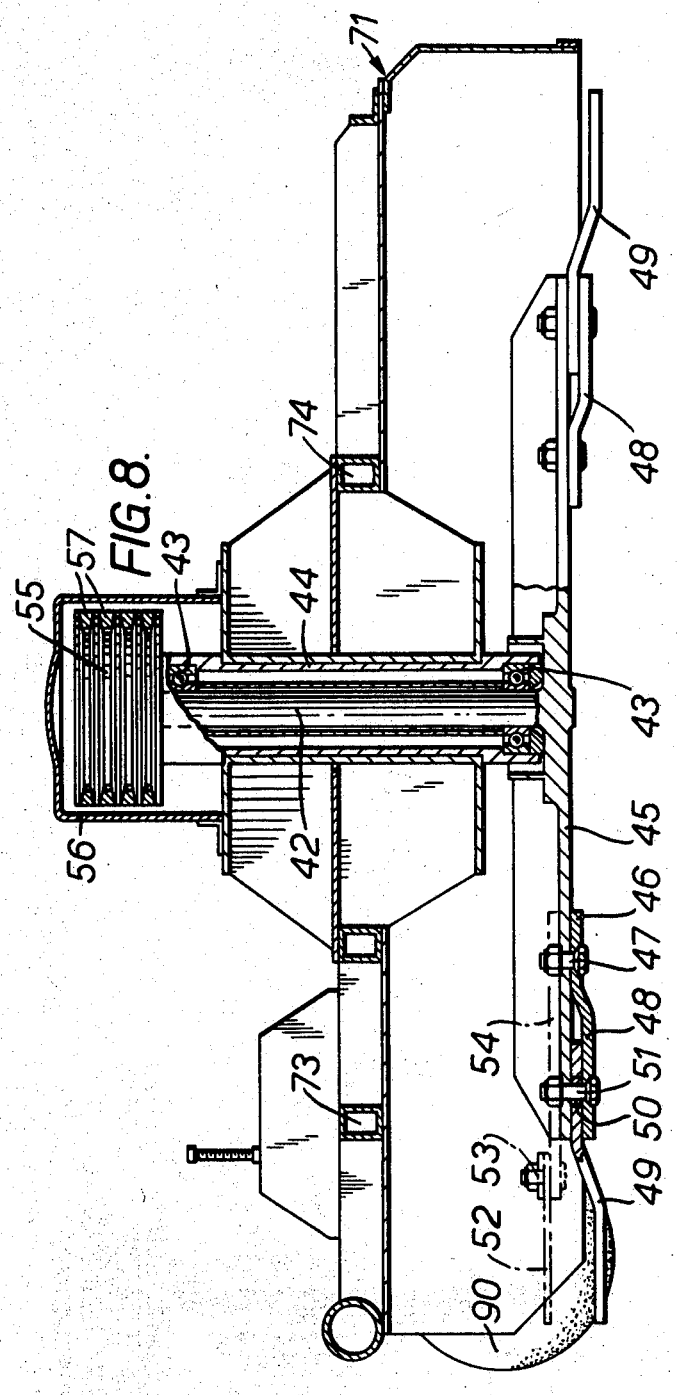

United States Patent Office 3,527,033
Patented Sept. 8, 1970

3,527,033
AGRICULTURAL MOWERS
William T. Teagle, Blackwater, Truro, Cornwall, England
Filed May 15, 1967, Ser. No. 638,345
Claims priority, application Great Britain, May 17, 1966,
21,895/66
Int. Cl. A01d 35/26
U.S. Cl. 56—25.4                                    13 Claims

ABSTRACT OF THE DISCLOSURE

A mower to be attached to the power lift linkage of a towing tractor with its cutting blades operatively connected to the power take-off shaft of the tractor for rotation about a vertical axis in a path offset from the path of travel of the tractor, the whole or a part of the mower being displaceable through 90° relative to the tractor to align the cutting blades behind the tractor and reduce the overall width of the mower for towing in its non-operational state.

---

This invention relates to tractor-mounted rotary mowers and has for its object to provide an improved form of mower which is efficient in operation and easily transportable.

To this end, according to the invention, there is provided a mower comprising a wheeled frame, a vertical cutter shaft rotatably mounted in said frame and provided at its lower end with a plurality of radially extending horizontal cutting blades, drive-transmitting means for operatively connecting said cutter shaft to the power take-off shaft of a tractor, and means for detachably securing said frame to the power lift linkage of the tractor either in an operative position in which the cutting blades are offset to one side of the path of movement of the tractor or in an inoperative position in which the cutting blades are located directly behind the tractor.

The invention will be described in detail with reference to the accompanying drawings in which:

FIG. 5 is a side elevation of a transferable wheel and its support, showing in full lines the positions of the parts for use when the mower is inoperative and in broken lines the positions of some of the parts after adjustment for use with the mower in its operative state;

FIG. 6 is a rear perspective view of a second embodiment of the invention in its operative position;

FIG. 7 is a plan view of the embodiment shown in FIG. 6; and

FIG. 8 is a cross-section on the line VIII—VIII of FIG 7.

Figure 1:
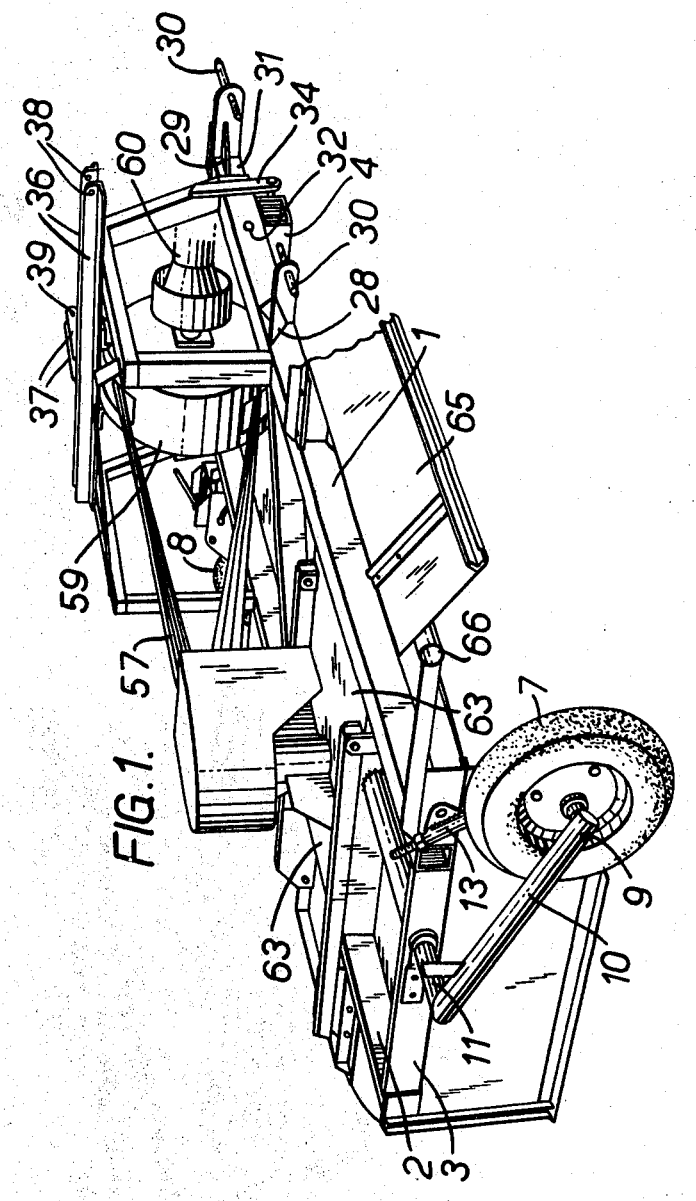
FIG. 1 is a perspective view of one embodiment of the invention in its operative position.

Referring first to FIGS. 1 to 5, the mower shown therein has a rigid frame including lower members 1, 2, 3 and 4 and upper members 5 and 6, which frame runs on wheels 7 and 8 which in the operative position of the mower constitute the offside outer front wheel and the nearside trailing rear wheel respectively. The wheel 7 has an axle 9 one end of which is rotatably secured to one arm 10 of a bracket, the other arm 11 of which is pivotally mounted in the frame member 3, and the other end of which is rotatably secured to a threaded rod 12 adjustably mounted in a bracket 13 pivotally secured to the frame member 3 in the manner shown in either FIG. 1 or FIG. 4. The wheel 8 has an axle 14 rotatably mounted in a pair of arms 15 connected together by a bar 16 and pivotally mounted at 17 on a bracket 18 to the sides of which the arms are connected by bolts 19, passing through slots 20 in the arms. The bracket 18 is pivotally mounted on a pin 21 passing through an arm 22 which is adapted to be fitted in the frame member 4 in the operative position of the mower and in the frame member 1 in the inoperative position of the mower and to be retained in one or other of said frame members by a pin 23 passing through apertures in the frame members which register with an aperture 24 in the arm. The arms 15 and with them the wheel 8, are adjustable relative to the bracket 18 about the pivot 17 between the position shown in full lines in FIG. 5 in which further movement is prevented by the bolts 19 engaging one end of the slots 20 and a locking pin 25 (FIG. 2) inserted in an aperture 26 in the bracket engaging the edges of the arms, and the position shown in broken lines in FIG. 5 in which the bolts engage the other ends of the slots 20 and the bar 16 engages the head of a threaded rod 27 adjustably mounted in the bracket 18. The full-time position of the arms 15 is for use in the inoperative position of the mower when the arm 22 is retained within the frame member 1 and the broken-line position of the arms is for use in the operative position of the mower when the arm is retained within the frame member 4.

Brackets 28 and 29 carrying hitching pins 30 for attachment to the side members of a tractor power lift three-point linkage when the mower is in its operative position, are rigidly and adjustably secured respectively to the frame member 1, the bracket 29 being mounted on an arm 31 which is loosely retained within the frame member 1 by a pin 32 to enable the bracket and associated hitching pin to follow upward and downward movement of the wheel 7, which is axially aligned therewith, when the mower is passing over uneven ground. As shown in FIG. 2 pins 30 are laterally aligned with axle 9. A second pair of hitching pins 33, for attachment to the associated members of the tractor power lift linkage when the mower is in its inoperative position, are mounted on arms 34 and 35 rigidly secured to the frame members 1 and 2 respectively and their associated upper frame members 5 and 6 respectively which latter members support a pair of cross-members 36, which in turn support a pair of arms 37 (FIGS. 1 and 3) extending at right angles thereto. The cross-members 36 and the arms 37 are aperatured at 38 and 39 respectively for attachment to the central point of the tractor power lift linkage when the mower is in its operative and inoperative positions respectively.

The mower frame supports a cutter housing the rear portion 40 of which may be arranged to open to enable cut material to be deposited directly behind the mower, and the upper portion 41 of which is apertured for the passage of a vertical cutter shaft 42 (FIG. 8) rotatable in bearings 43 in a cylindrical casing 44 and provided at its lower end with a flange 45 to which blade holders 46 are secured by bolts 47. The blade holders 46 are provided with offset portions 48 between which and the underside of the flange 45 are interposed cutting blades 49 yieldably mounted on bushes 50 surrounding bolts 51 connecting said offset portions to the flange. As shown in broken lines in FIG. 8, additional blades 52 each having one edge rounded and the other sharp may be detachably secured by bolts 53 to additional blade holders 54 secured to the upper surface of the flange 45, to present either their rounded edges to the grass for crimping or their sharp edges to the grass for double cutting. The upper end of the cutter shaft 42 carries a pulley 55 surrounded by a belt guard 56 and operatively connected by V-belts 57, twisted intermediate their length, to a pulley 58 surrounded by a belt guard 59 and secured to one end of a horizontal shaft 60 the other end of which is adapted to be operatively connected to the power take-off shaft of the tractor. Although the cutters and the driving mechanism therefor have been described with reference to the embodiment of the invention shown in FIGS. 6 to 8, it will be understood that this mechanism is substantially identical in both embodiments with the exception that the embodiment shown in FIGS. 1 to 5 employs three driving belts 57 tensioned by springs 61 acting on the pulley 58, whereas the embodiment shown in FIGS. 6 to 8 employs four driving belts 57 tensioned by springs 62 acting on the pulley 55.

The upper part 41 of the housing is preferably provided, in the vicinity of the cutter shaft 42, with two or more panels 63 which are removable or otherwise displaceable to regulate the entry of air to the cutting mechanism.

Extending forward from the mower, as looked at in its operative position, is a canopy 64 to the outer end of which is secured a flap or baffle 65 which is adjustable about a horizontal pivot shaft 66 to control air circulation through the mower and prevent short grass from being blown forward. A swath board 67 provided on the nearside of the mower in its operative position, is pivotally mounted at 68 on the mower frame to permit free swivelling movement of the wheel 8.

Figure 2:
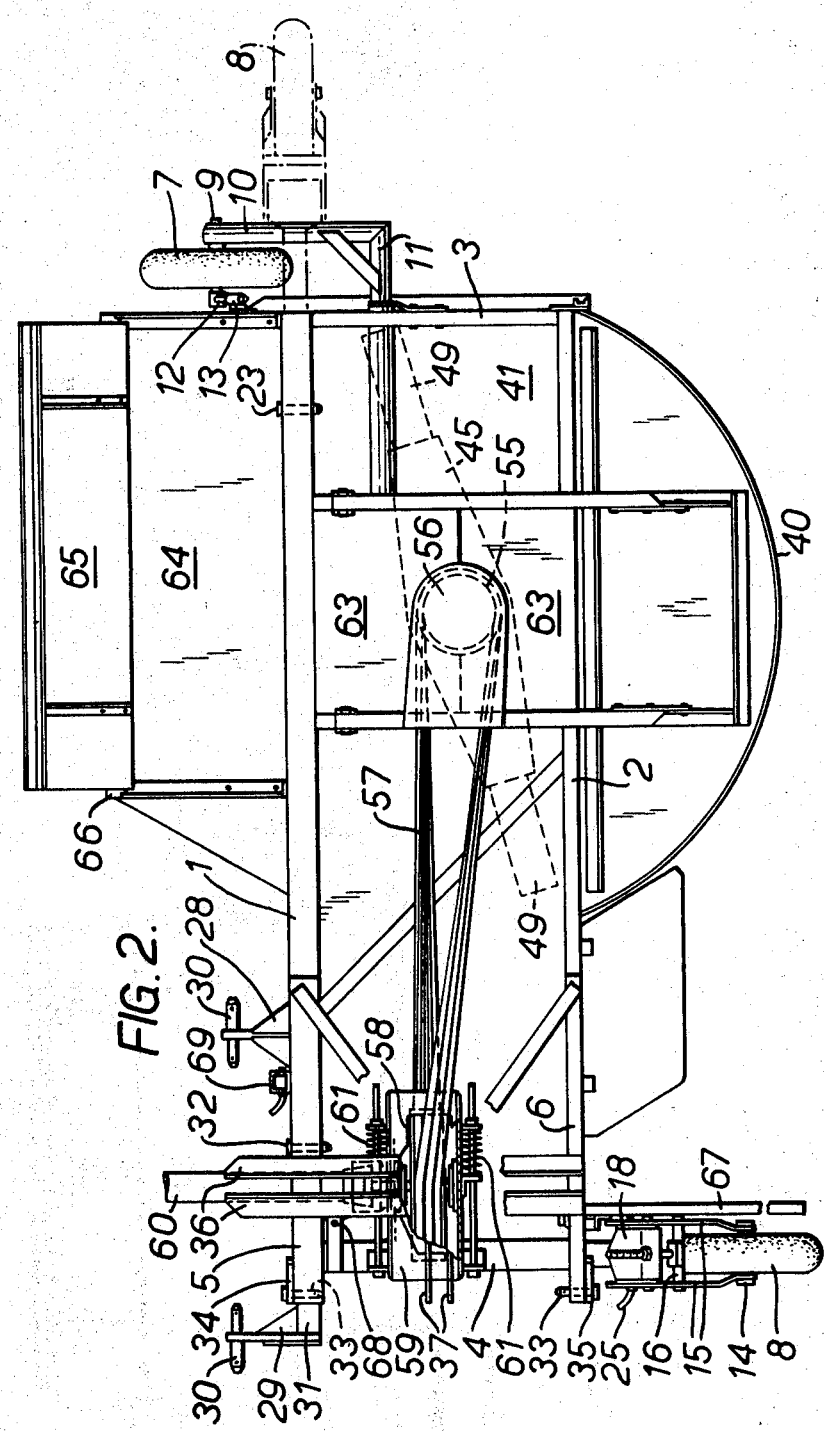
FIG. 2 is a plan view, with parts broken away, of the embodiment shown in FIG. 1.
Figure 3:
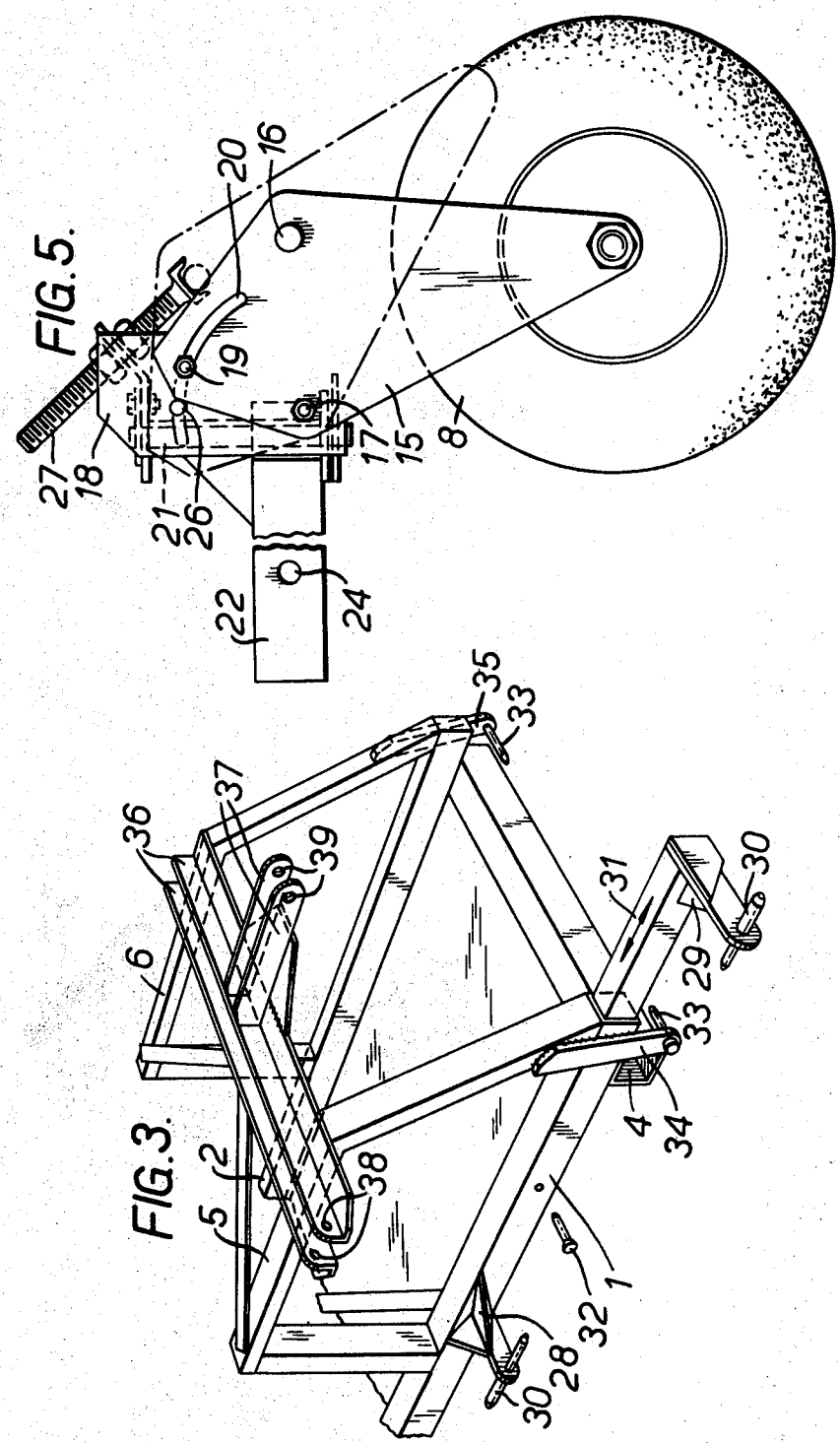
FIG. 3 is a fragmentary perspective view of the nearside part of the frame of the embodiment shown in FIGS. 1 and 2.
Figure 4:
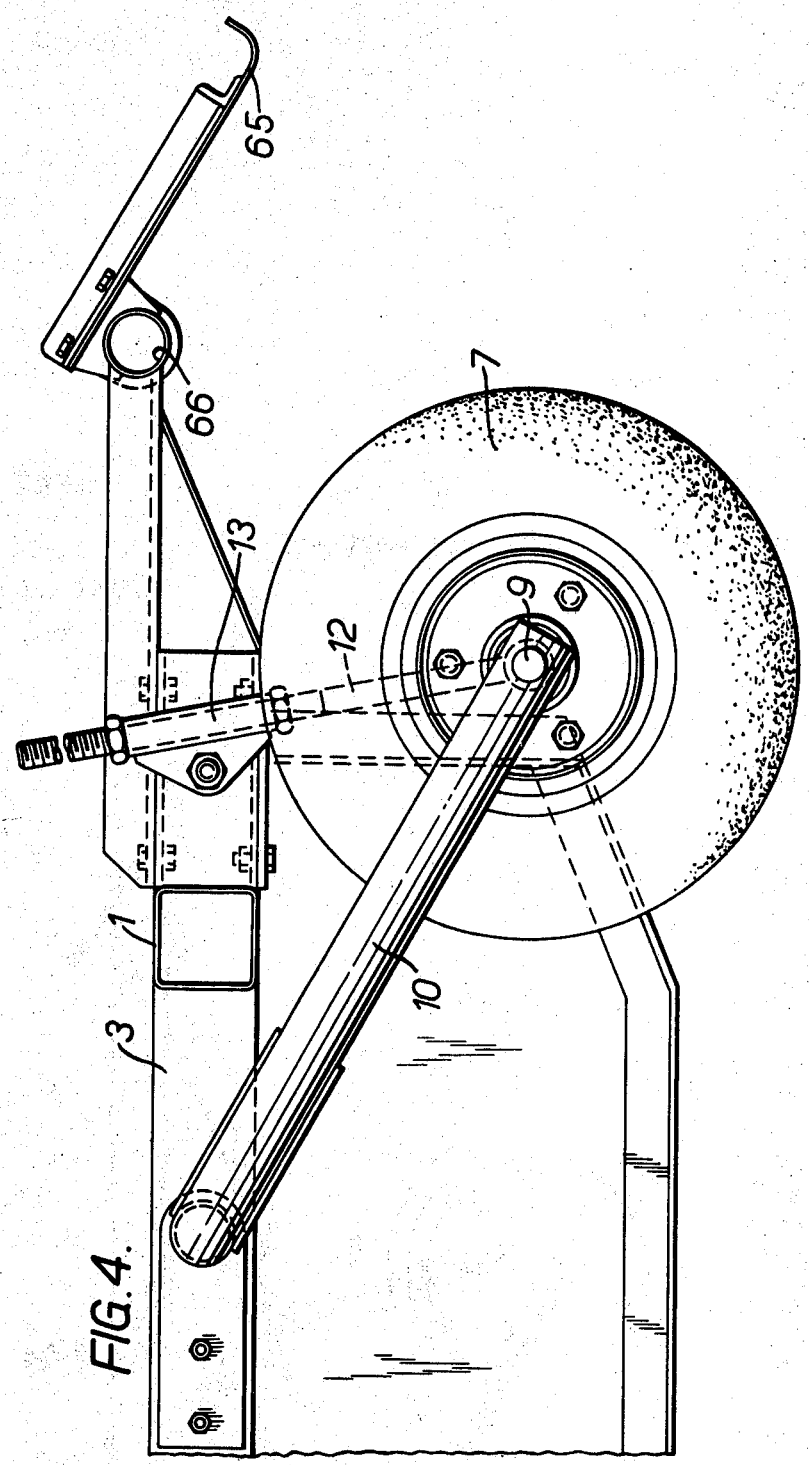
FIG. 4 is a fragmentary side elevation of a modified front offside part of the embodiment shown in FIGS. 1 to 3.

In the operative position of the mower shown in FIGS. 1 and 2 the wheels 7 and 8 are arranged to be intersected by a vertical plane passing on a diameter through the cutting circle of the blades 49 with the wheel 7 situated in front of and the wheel 8 situated behind the cutter shaft 42 to give the advantages of a triangular arrangement which affords close and even cutting. In addition, the cutting blades are offset from the path of movement of the tractor which cannot, therefore, flatten the crop before cutting. When the mower is required to be towed back to the farm or from one field to another between cutting operations, a jack 69 secured to the frame member 1 is lowered to support the nearside of the mower while the wheel 8 is transferred from the position shown in full lines to that shown in broken lines in FIG. 2 and the tractor is disengaged from the hitching points 30 and 38 and reattached to the hitching points 33 and 39. The jack 69 can then be raised as also can the wheel 7 by adjustment of the threaded rod 12 after which the mower is ready to be transported in its inoperative position in which its width is little or no greater than that of the tractor.

In the embodiment shown in FIGS. 6 to 8 the mower frame is in two sections 70 and 71 pivotally connected together along a horizontal shaft 72. The section 71 includes transverse frame members 73 and 74 pivotally mounted on the shaft 72 which is carried by transverse frame members 75 and 76 of the frame section 70 which supports a swath board 94 and also includes longitudinal frame members 77 and 78 on which are mounted members 79, 80 and 81 adapted for connection to the three-point power lift linkage of a tractor. The frame member 74 of the frame section 71 is secured, as by welding, to a plate 82 which is in turn welded to an arm 83 the free end of which is acted upon by a hydraulic ram 84 pivotally mounted in a bracket 85 secured, as by welding, to a plate 86 welded to upright members 87 and 88 of the frame section 70. The hydraulic ram 84 is provided with a flexible supply line 89 for connection to the hydraulic system of the tractor and is adapted, when fluid under pressure is supplied thereto, to swing the frame section 71 through 90° about the axis of the shaft 72, from the operative position shown in FIGS. 6 and 7 to an inoperative position (not shown) in which it is aligned behind the tractor. The frame section 71 carries rotary cutters which in construction and mode of operation are the same as those described with reference to the embodiment of the invention shown in FIGS. 1 to 5 and the various parts of which are designated by the same reference numerals as those previously described. The frame section 71 is provided with ground wheels 90 and 91 mounted in brackets 92 and 93 secured to the frame members 73 and 74 respectively on a diameter through the cutting circle of the blades 49 with the offside wheel 90 situated in front of the nearside wheel 91 situated behind the cutter shaft 42 to give the same advantages as those obtained with the embodiment of FIGS. 1 to 5 in its operative position.

With the mower in its operative position shown in FIGS. 6 and 7 the cutting blades 49 are offset from the path of movement of the tractor which latter cannot therefore flatten the crop in front of the mower. When cutting is finished the tractor hydraulic lift arms are raised to lift the mower from the ground and the hydraulic ram 84, upon operation by the tractor driver, acts through the arm 83 to swing the frame section 71 about the shaft 72 into a vertical position behind the tractor, thus reducing its width for transport and also facilitating access to the cutting blades 49 and associated parts for maintenance purposes.

I claim:

1. A rotary mower comprising a frame, a vertical cutter shaft rotatably mounted in said frame and provided at its lower end with a plurality of radially extending cutting blades, a first pulley at the upper end of said cutter shaft, a horizontal driving shaft having on one end a second pulley disposed at right angles to said first pulley, belts twisted intermediate their lengths operatively interconnecting said pulleys, means on the other end of said driving shaft for operative connection to the power take-off shaft of a tractor, means on said frame for detachably securing it to the power lift linkage of said tractor in such relation that said cutting blades are offset to one side of the path of movement of the tractor, and two ground wheels mounted in brackets secured to opposite side members of said frame with the one wheel situated forwardly of and the other wheel situated rearwardly of said cutter shaft, said wheels being disposed to be intersected by a vertical plane passing through the center of the cutting circle of said blades.

2. A rotary mower according to claim 1 wherein said other rearwardly situated wheel is located at the inner side of said mower frame and the one forwardly situated wheel is located at the outer side of said mower frame.

3. A rotary mower according to claim 1, wherein said one wheel is transversely aligned with a pair of hitching pins mounted on a front member of said frame for attachment to the power lift arms of the tractor.

4. A rotary mower according to claim 1, provided with a rearwardly extending swath board mounted on one side member of the frame inwardly of and adjacent to said other wheel and pivotable about a vertical axis to accommodate similar pivotal movement of said other wheel.

5. A rotary mower according to claim 1, wherein said front and one side member of said frame are each provided with a pair of hitching pins, said pairs being adapted for alternate attachment to the power lift linkage of the tractor.

6. A rotary mower according to claim 5, wherein the bracket for said other wheel is removable from its mounting on said one side member of the mower frame and an alternative mounting therefor is provided in the front member of said frame adjacent to the mounting for said one wheel, means being provided on the bracket for said one wheel for raising its wheel clear of the ground when said other wheel is in its alternative position.

7. A rotary mower according to claim 6, wherein the front and said one side frame member are hollow and said other wheel is pivotally mounted for movement about a vertical axis on an arm adapted to enter and be retained in either the rear end of said one side frame member or the end of said front frame member adjoining said other side frame member.

8. A rotary mower according to claim 5, wherein the bracket for said one wheel is pivotally mounted in the other side member of said frame for movement about a horizontal axis and one of the hitching pins is carried by an arm loosely mounted in the end of the front member of said frame adjoining said one side member to permit said hitching pin to follow up and down movement of said one wheel when passing over uneven ground.

9. A rotary mower according to claim 1, comprising a first frame section supporting said second pulley and adapted to be detachably secured to the power lift linkage, a second frame section supporting the cutting mechanism and pivotally mounted upon a longitudinal member of said first frame section, a hydraulic ram carried by said first frame section and acting upon said second frame section and means for operating said ram from the tractor hydraulic system to swing said second frame section through 90° about its pivotal axis between a horizontal operative position and a substantially vertical inoperative position behind the tractor.

10. A rotary mower according to claim 1, wherein said cutting blades are enclosed in a housing provided at its forward end with a pivoted flap adjustable about a transverse horizontal axis to control air circulation in said housing.

11. A rotary mower according to claim 10, wherein the upper end of said housing is provided with displaceable panels for controlling the entry of air to the cutter shaft.

12. A rotary mower according to claim 1, provided with a pair of aligned cutting blades yieldably secured to the lower surface of a flange at the lower end of the cutter shaft.

13. A rotary mower according to claim 12, provided with additional cutting blades yieldably secured to the upper surface of said flange and reversible to present either a sharp edge for cutting or a rounded edge for crimping.

References Cited
UNITED STATES PATENTS

| | | | |
|---|---|---|---|
| 2,815,631 | 12/1957 | Northcote et al. | 56—25.4 |
| 2,924,058 | 2/1960 | Brooks | 56—295 |
| 2,994,174 | 8/1961 | Northcote et al. | 56—25.4 |
| 3,063,225 | 11/1962 | Barrentine | 56—25.4 |
| 3,110,146 | 11/1963 | Latshaw | 56—25 |
| 3,152,432 | 10/1964 | Scarnato et al. | 56—295 |
| 3,338,037 | 8/1967 | Bauer et al. | 56—24 |
| 3,369,350 | 2/1968 | Rogers et al. | 56—25.4 |

RUSSELL R. KINSEY, Primary Examiner